US010397991B2

(12) United States Patent
Newman, Jr. et al.

(10) Patent No.: US 10,397,991 B2
(45) Date of Patent: Aug. 27, 2019

(54) LOAD CONTROL DEVICE FOR A LIGHT-EMITTING DIODE LIGHT SOURCE

(71) Applicant: Lutron Technology Company LLC, Coopersburg, PA (US)

(72) Inventors: Robert C. Newman, Jr., Emmaus, PA (US); Stuart W. DeJonge, Riegelsville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 15/496,932

(22) Filed: Apr. 25, 2017

(65) Prior Publication Data
US 2017/0311400 A1 Oct. 26, 2017

Related U.S. Application Data

(60) Provisional application No. 62/327,198, filed on Apr. 25, 2016.

(51) Int. Cl.
*H05B 33/08* (2006.01)
*H05B 37/02* (2006.01)

(52) U.S. Cl.
CPC ..... *H05B 33/0815* (2013.01); *H05B 33/0824* (2013.01); *H05B 33/0851* (2013.01); *H05B 37/02* (2013.01); *H05B 37/029* (2013.01); *Y02B 20/346* (2013.01)

(58) Field of Classification Search
CPC .............. H05B 33/0815; H05B 37/029; H05B 33/0824; H05B 33/0851; H05B 37/02; H02M 5/4505
See application file for complete search history.

(56) References Cited

U.S. PATENT DOCUMENTS

| 4,331,994 | A | * | 5/1982 | Wirth ..................... H02H 3/445 361/100 |
| 7,075,254 | B2 | | 7/2006 | Chitta et al. |
| 7,609,040 | B1 | * | 10/2009 | Jain ..................... H02M 3/1584 323/276 |
| 8,492,987 | B2 | | 7/2013 | Nuhfer et al. |
| 8,593,076 | B2 | | 11/2013 | Veskovic |
| 8,680,787 | B2 | | 3/2014 | Veskovic |
| 8,866,401 | B2 | | 10/2014 | Shearer et al. |
| 9,113,521 | B2 | | 8/2015 | Gredler et al. |

(Continued)

*Primary Examiner* — Jue Zhang
*Assistant Examiner* — Bart Iliya
(74) *Attorney, Agent, or Firm* — Condo Roccia Koptiw LLP

(57) ABSTRACT

A load control device for controlling power delivered from a power source to an electrical load may comprise a control circuit configured to control the load regulation circuit to control the power delivered to the electrical load. The control circuit may be configured to operate in an AC mode when an input voltage is an AC voltage and in a DC mode when the input voltage is a DC voltage. The control circuit may be configured to disable the power converter in the DC mode. The control circuit may be configured to render a controllable switching circuit conductive in the AC mode, and non-conductive in the DC mode. The rectifier circuit may be configured to rectify the input voltage to generate a rectified voltage when the input voltage is an AC voltage, and to pass through the input voltage when the input voltage is a DC voltage.

19 Claims, 7 Drawing Sheets

(56) References Cited

U.S. PATENT DOCUMENTS

| | | | |
|---|---|---|---|
| 9,155,144 B2 | 10/2015 | Mitterbacher | |
| 9,232,574 B2 | 1/2016 | Veskovic | |
| 9,247,608 B2 | 1/2016 | Chitta et al. | |
| 9,253,829 B2 | 2/2016 | Veskovic | |
| 9,462,660 B2 | 10/2016 | Chitta et al. | |
| 9,565,731 B2 | 2/2017 | DeJonge | |
| 9,655,180 B2 | 5/2017 | Stevens, Jr. et al. | |
| 2012/0001599 A1* | 1/2012 | Tanaka | H02M 1/10 323/205 |
| 2013/0063047 A1* | 3/2013 | Veskovic | H05B 33/0815 315/307 |
| 2014/0361699 A1 | 12/2014 | Sullivan et al. | |
| 2016/0248264 A1* | 8/2016 | Herfurth | H02M 3/156 |
| 2017/0229892 A1* | 8/2017 | Kobayashi | H01R 24/60 |

\* cited by examiner

LOAD CONTROL DEVICE FOR A LIGHT-EMITTING DIODE LIGHT SOURCE

CROSS-REFERENCE TO RELATED APPLICATIONS

This application claims the benefit of U.S. Provisional Application No. 62/327,198, filed Apr. 25, 2016, all of which is incorporated by reference in its entirety.

BACKGROUND

Light-emitting diode (LED) light sources (such as, for example, LED light engines) are often used in place of or as replacements for conventional incandescent, fluorescent, or halogen lamps, and the like. LED light sources may comprise a plurality of light-emitting diodes mounted on a single structure in a suitable housing. LED light sources are typically more efficient and provide longer operational service as compared to incandescent, fluorescent, and halogen lamps. In order to illuminate properly, an LED driver is typically coupled between an alternating-current (AC) source and the LED light source for regulating the power supplied to the LED light source. The LED driver may regulate either the voltage provided to the LED light source to a particular value, the current supplied to the LED light source to a specific peak current value, or both the current and the voltage. Examples of LED drivers are described in greater detail in commonly-assigned U.S. Pat. No. 8,492,987, issued Jul. 23, 2010, and U.S. Pat. No. 8,680,787, issued Mar. 25, 2014, both entitled LOAD CONTROL DEVICE FOR A LIGHT-EMITTING DIODE LIGHT SOURCE, the entire disclosures of which are hereby incorporated by reference.

As the electrical infrastructure changes to accommodate renewable energy sources (e.g., wind power, photovoltaic solar power, full cells, etc.), it is likely that there will be a movement towards DC power distribution as this is the native version of generation for many of these technologies. For example, photovoltaic solar arrays generate DC power and often this is directly stored in batteries. From there, power may be provided directly from the batteries, or it may be inverted to alternating current for use by appliances. With this anticipated move to a DC power bank, it would be desirable to provide power directly as DC power rather than convert it to AC power. Many AC electrical loads actually use DC power to perform their functions, and traditionally require rectification, and often, active power factor correction (PFC), to make the AC power useful to the electrical load. However, the rectification and active power factor correction operations introduce an efficiency loss.

SUMMARY

As described herein, a load control device for controlling power delivered from a power source to an electrical load may comprise a power converter configured to generate a bus voltage across a bus capacitor; a load regulation circuit configured to receive the bus voltage and to control the power delivered to the electrical load; and a control circuit configured to control the load regulation circuit to control the power delivered to the electrical load. The control circuit may be configured to operate in an AC mode when an input voltage is an AC voltage, and in a DC mode when the input voltage is a DC voltage. The control circuit may be configured to disable the power converter in the DC mode, for example, when the power required by the load is less than a threshold amount. In addition, the control circuit may be configured to control the power converter circuit to adjust the magnitude of the bus voltage towards a target bus voltage, and adjust the target bus voltage as a function of the power required by the load, when the power required by the load is greater than the threshold amount in the DC mode. Additionally, or alternatively, the control circuit may be configured to reduce the target bus voltage in the DC mode.

The load control device may comprise a controllable switching circuit electrically coupled in series with the bus capacitor. The control circuit may be configured to render the controllable switching circuit conductive in the AC mode and non-conductive in the DC mode. The control circuit may include a rectifier circuit that includes input terminals and a DC detect circuit. The rectifier circuit may also include a plurality (e.g., two) controllable switching circuits. The DC detect circuit may be electrically coupled between the input terminals of the rectifier circuit. The DC detect circuit may be configured to render the controllable switching circuits of the rectifier circuit conductive when the voltage across the DC detect circuit is a DC voltage (e.g., and render them non-conductive when the voltage across the DC detect circuit is AC voltage). The load control device may also include a ripple detect circuit (e.g., AC ripple detect circuit) that is configured to receive a rectified voltage and generate a ripple detect signal that indicates whether AC ripple is present in the rectified voltage. The ripple detect circuit may provide the ripple detect signal to the control circuit, and the control circuit may be configured to determine whether the input voltage is AC voltage or DC voltage based on the ripple detect signal.

The rectifier circuit may be configured to rectify the input voltage to generate a rectified voltage when the input voltage is an AC voltage, and to pass through the input voltage when the input voltage is a DC voltage. The rectifier circuit may comprise: (1) first and second input terminals (e.g., AC input terminals); (2) first and second output terminals (e.g., DC output terminals); (3) a first diode configured to conduct current from the first input terminal to the first output terminal; (4) a second diode configured to conduct current from the second output terminal to the second input terminal; (5) a third diode configured to conduct current from the second input terminal to the first output terminal; (6) a fourth diode configured to conduct current from the second output terminal to the first input terminal; (7) a first controllable switching circuit (e.g., a MOSFET) coupled in parallel with the first diode; and (8) a second controllable switching circuit (e.g., a MOSFET) coupled in parallel with the second diode. The first and second switching circuits may be rendered non-conductive when a voltage across the input terminals is an AC voltage and rendered conductive when the voltage across the input terminals is a DC voltage. The rectifier circuit may also comprise a DC detect circuit that may be electrically coupled between the input terminals and may be configured to render the first and second controllable switching circuits conductive when the voltage across the DC detect circuit is a DC voltage.

DETAILED DESCRIPTION

Figure 1:
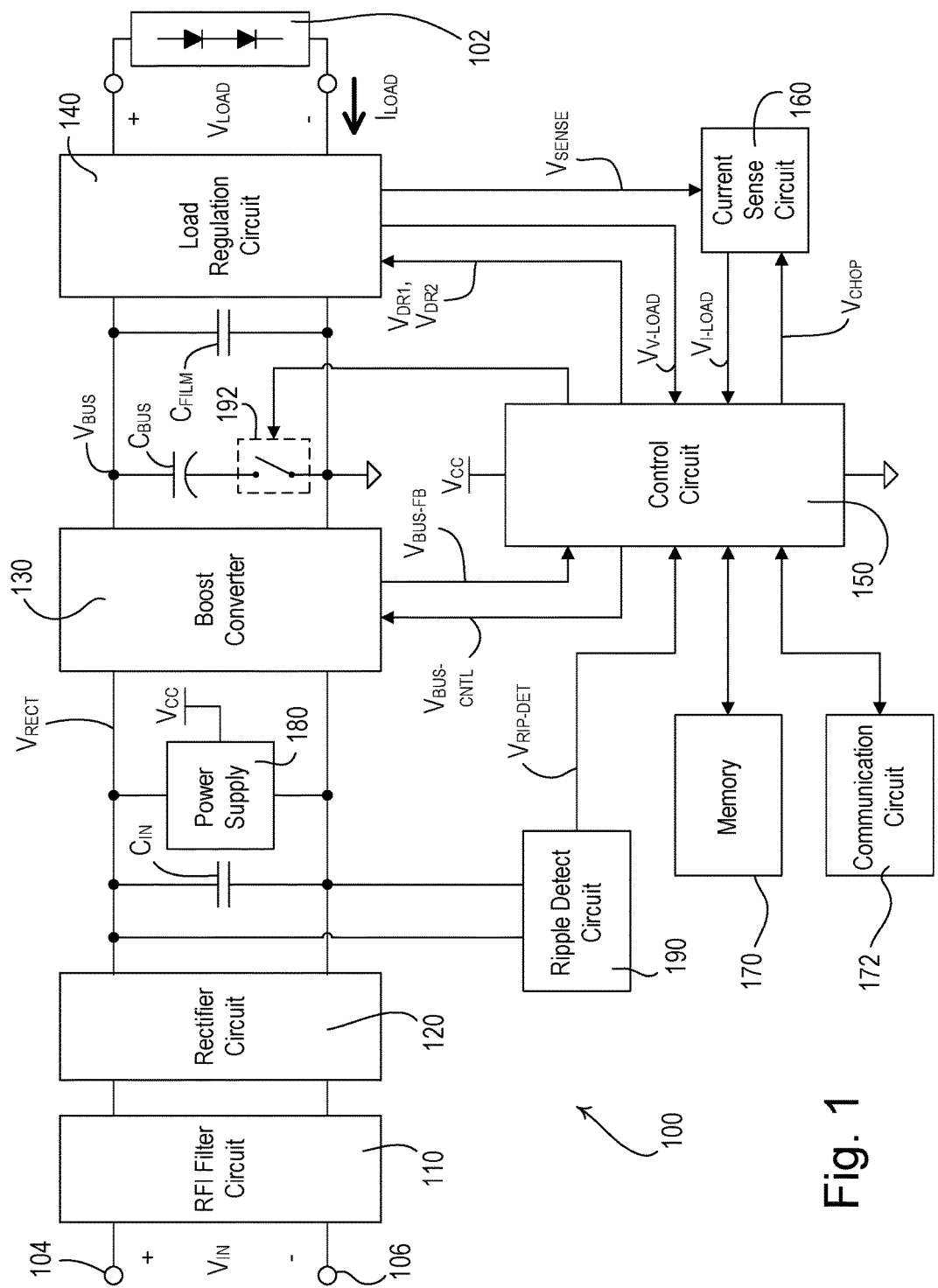
FIG. 1 is a simplified block diagram of an example light-emitting diode (LED) driver for controlling the intensity of an LED light source.

FIG. 1 is a simplified block diagram of a load control device, e.g., a light-emitting diode (LED) driver 100, for controlling the amount of power delivered to an electrical load, such as an LED light source 102 (e.g., an LED light engine), and thus the intensity of the electrical load. The LED light source 102 is shown as a plurality of LEDs connected in series, but may comprise a single LED, or a plurality of LEDs connected in parallel, or a suitable combination thereof, depending on the particular lighting system. The LED light source 102 may comprise one or more organic light-emitting diodes (OLEDs). The LED driver 100 may comprise a first input terminal 104 (e.g., a hot terminal) and a second input terminal 106 (e.g., a neutral terminal) that are adapted to be coupled to a power source (not shown), such as, e.g., an alternating-current (AC) power source, or a direct-current (DC) power source. The first and second input terminals 104, 106 may be configured to receive an input voltage $V_{IN}$, e.g., an AC mains input voltage, or a DC input voltage.

The LED driver 100 may comprise a radio-frequency (RFI) filter circuit 110, a rectifier circuit 120, a boost converter 130, a load regulation circuit 140, a control circuit 150, a current sense circuit 160, a memory 170, a communication circuit 172, and/or a power supply 180. The RFI filter circuit 110 may minimize the noise provided on the AC mains. The rectifier circuit 120 may be a dynamic rectifier circuit configured to change its operation in response to whether an AC voltage or a DC voltage is present at the input terminals 104, 106 (as will be described in greater detail below with reference to FIGS. 4 and 5). The rectifier circuit 120 may be configured to rectify the input voltage $V_{IN}$ to generate a rectified voltage $V_{RECT}$ when the input terminals are connected to an AC power source and an AC voltage is present at the input terminals 104, 106. The rectifier circuit 120 may be configured to pass through the input voltage $V_{IN}$ (e.g., not rectify the input voltage $V_{IN}$) when the input terminals are connected to a DC power source and a DC voltage is present at the input terminals 104, 106.

The boost converter 130 may receive the rectified voltage $V_{RECT}$ and generate a boosted direct-current (DC) bus voltage $V_{BUS}$ across a bus capacitor $C_{BUS}$ (such as, e.g., an electrolytic capacitor). The boost converter 130 may comprise any suitable power converter circuit for generating an appropriate bus voltage, such as, for example, a flyback converter, a single-ended primary-inductor converter (SEPIC), a Ćuk converter, or other suitable power converter circuit. The boost converter 130 may operate as a power factor correction (PFC) circuit to adjust the power factor of the LED driver 100 towards a power factor of one. The LED driver 100 may comprise an input capacitor $C_{IN}$ (such as, e.g., a film capacitor) coupled across the input of the boost converter 130. Examples of LED drivers having boost converters are described in greater detail in commonly-assigned U.S. Pat. No. 8,492,987, issued Jul. 23, 2013, and U.S. Pat. No. 8,680,787, issued Mar. 25, 2014, both entitled LOAD CONTROL DEVICE FOR A LIGHT-EMITTING DIODE LIGHT SOURCE, the entire disclosures of which are hereby incorporated by reference.

The load regulation circuit 140 may receive the bus voltage $V_{BUS}$ and control the amount of power delivered to the LED light source 102, for example, to control the intensity of the LED light source 102 between a low-end (i.e., minimum) intensity $L_{LE}$ (e.g., approximately 1-5%) and a high-end (i.e., maximum) intensity $L_{HE}$ (e.g., approximately 100%). An example of the load regulation circuit 140 may be an isolated, half-bridge forward converter. An example of the load control device (e.g., LED driver 100) comprising a forward converter is described in greater detail in commonly-assigned U.S. Pat. No. 9,253,829, issued Feb. 2, 2015, entitled LOAD CONTROL DEVICE FOR A LIGHT-EMITTING DIODE LIGHT SOURCE, the entire disclosure of which is hereby incorporated by reference. The load regulation circuit 140 may comprise, for example, a buck converter, a linear regulator, or any suitable LED drive circuit for adjusting the intensity of the LED light source 102.

The control circuit 150 may be configured to control the operation of the boost converter 130 and/or the load regulation circuit 140. The control circuit 150 may comprise, for example, a digital controller or any other suitable processing device, such as, for example, a microcontroller, a programmable logic device (PLD), a microprocessor, an application specific integrated circuit (ASIC), or a field-programmable gate array (FPGA). The control circuit 150 may generate a bus voltage control signal $V_{BUS-CNTL}$, which may be provided to the boost converter 130 for adjusting the magnitude of the bus voltage $V_{BUS}$ towards a target bus voltage $V_{BUS-TARGET}$. The control circuit 150 may receive a bus voltage feedback control signal $V_{BUS-FB}$ from the boost converter 130, which may indicate the magnitude of the bus voltage $V_{BUS}$.

The control circuit 150 may generate drive control signals $V_{DR1}$, $V_{DR2}$. The drive control signals $V_{DR1}$, $V_{DR2}$ may be provided to the load regulation circuit 140 for adjusting the magnitude of a load voltage $V_{LOAD}$ generated across the LED light source 102, and/or the magnitude of a load current LOAD conducted through the LED light source 120, for example, to control the intensity of the LED light source 120 to a target intensity $L_{TRGT}$. The control circuit 150 may adjust an operating frequency fop and/or a duty cycle $DC_{INV}$ (e.g., an on-time $T_{ON}$ as a percentage of the period T) of the drive control signals $V_{DR1}$, $V_{DR2}$ to adjust the magnitude of the load voltage $V_{LOAD}$ and/or the load current $I_{LOAD}$. The control circuit 150 may receive a load voltage feedback signal $V_{V-LOAD}$ generated by the load regulation circuit 140. The load voltage feedback signal $V_{V-LOAD}$ may indicate the magnitude of the load voltage $V_{LOAD}$.

The current sense circuit 160 may receive a sense voltage $V_{SENSE}$ generated by the load regulation circuit 140. The sense voltage $V_{SENSE}$ may indicate the magnitude of the load current $I_{LOAD}$. The current sense circuit 160 may receive a signal-chopper control signal $V_{CHOP}$ from the control circuit 150. The current sense circuit 160 may generate a load current feedback signal $V_{I-LOAD}$, which may be a DC voltage indicating the average magnitude $I_{AVE}$ of the load current $I_{LOAD}$. The control circuit 150 may receive the load current feedback signal $V_{I-LOAD}$ from the current sense circuit 160 and control the drive control signals $V_{DR1}$, $V_{DR2}$ accordingly. For example, the control circuit 150 may control the drive control signals $V_{DR1}$, $V_{DR2}$ to adjust a magnitude of the load current $I_{LOAD}$ to a target load current $I_{TRGT}$ to thus control the intensity of the LED light source 102 to the target intensity $L_{TRGT}$ (e.g., using a control loop). The control circuit 150 may be configured to determine a load power $P_{LOAD}$ presently being consumed by the LED light source 102 using the load voltage feedback signal $V_{V-LOAD}$ and the load current feedback signal $V_{I-LOAD}$. The load current $I_{LOAD}$ may be the current that is conducted through the LED light source 120. The target load current $I_{TRGT}$ may be the desired current that the control circuit 150 would ideally cause to be conducted through the LED light source 120 (e.g., based at least on the load current feedback signal $V_{I-LOAD}$).

The control circuit 150 may be coupled to the memory 170. The memory 170 may store operational characteristics of the LED driver 100 (such as, e.g., the target intensity $L_{TRGT}$, the low-end intensity $L_{LE}$, the high-end intensity $L_{HE}$, etc.). The communication circuit 172 may be coupled to, for example, a wired communication link, or a wireless communication link, such as a radio-frequency (RF) communication link or an infrared (IR) communication link. The control circuit 150 may be configured to update the target intensity $L_{TRGT}$ of the LED light source 102 and/or the operational characteristics stored in the memory 170 in response to digital messages received via the communication circuit 172. The LED driver 100 may be operable to receive a phase-control signal from a dimmer switch for determining the target intensity $L_{TRGT}$ for the LED light source 102. The power supply 180 may receive the rectified voltage $V_{RECT}$ and generate a direct-current (DC) supply voltage $V_{CC}$ for powering the circuitry of the LED driver 100.

The LED driver 100 may also comprise a ripple detect circuit 190, which may receive the rectified voltage $V_{RECT}$ and may generate a ripple detect signal $V_{RIP-DET}$ that may indicate whether AC ripple is present in the rectified voltage $V_{RECT}$ (i.e., whether an AC voltage is coupled to the input terminals 104, 106). The control circuit 150 may receive the ripple detect signal $V_{RIP-DET}$, and may operate in an AC mode if an AC voltage is coupled to the input terminals 104, 106, or a DC mode if a DC voltage is coupled to the input terminals. The ripple detect circuit 190 may also be coupled to receive the input voltage $V_{IN}$ and/or the bus voltage $V_{BUS}$. The LED driver 100 may also comprise a controllable switching circuit 192 (e.g., including a MOSFET) electrically coupled in series with the bus capacitor $C_{BUS}$ for disconnecting the bus capacitor, as will be described in greater detail below.

When operating in the AC mode, the control circuit 150 may enable the operation of the boost converter 130 to generate the bus voltage $V_{BUS}$ across the bus capacitor $C_{BUS}$. The control circuit 150 may render the controllable switching circuit 192 conductive and may control the magnitude of the bus voltage $V_{BUS}$ to a maximum magnitude $V_{BUS-MAX}$ (e.g., approximately 465 volts). The control circuit 150 may also operate the boost converter 130 as a PFC circuit during the AC mode to adjust the power factor of the LED driver 100 towards a power factor of one.

When operating in the DC mode, the control circuit 150 may be configured to disable the operation of the boost converter 130 to reduce power loss in the LED driver 100, for example, due to the power loss in the boost converter when enabled. When disabled, the boost converter 130 may pass through the DC voltage from the input terminals 104, 106, and the bus voltage $V_{BUS}$ may have a minimum magnitude $V_{BUS-MIN}$ (e.g., approximately 380 volts). When operating in the DC mode, the control circuit 150 may be configured to enable the boost converter 130 during a startup routine of the LED driver 100, and disable the boost converter during normal operation.

The control circuit 150 may render the controllable switching circuit 192 non-conductive to disconnect the bus capacitor $C_{BUS}$ in the DC mode because the bus capacitor $C_{BUS}$ may not be required when a DC voltage is present at the input terminals 104, 106. The LED driver 100 may also comprise a capacitor $C_{FILM}$ (e.g., a film capacitor) coupled across the input of the load regulation circuit 140 for supplying high-frequency current that may be required to circulate through the load regulation circuit. Because the bus capacitor $C_{BUS}$ may comprise one or more electrolytic capacitors, disconnecting the bus capacitor $C_{BUS}$ may increase the lifetime of the LED driver 100. In addition, disconnecting the bus capacitor $C_{BUS}$ may reduce an inrush current conducted by the LED driver 100 when power is first applied to the input terminals 104, 106.

Figure 2:
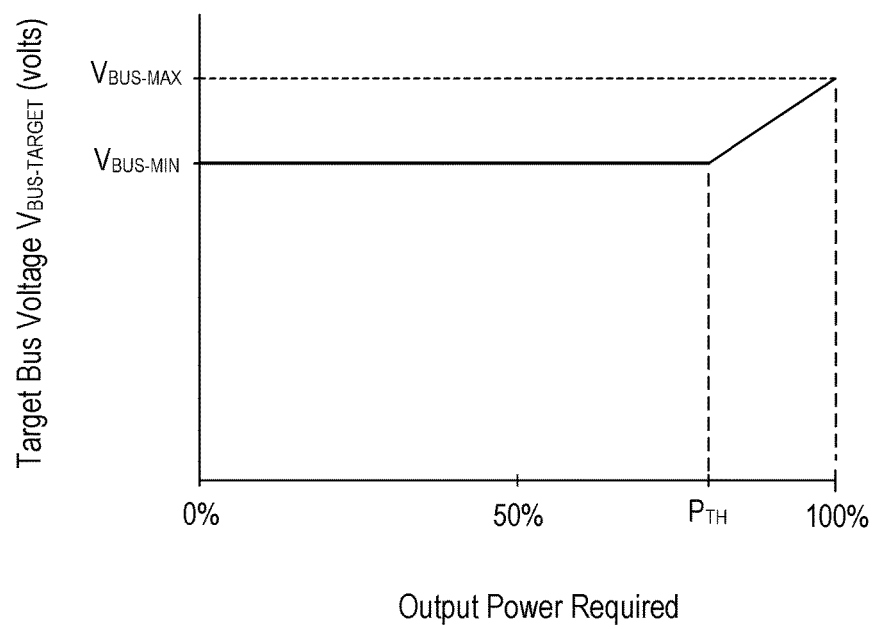
FIG. 2 is an example plot of a target bus voltage as a function of an amount of power required by an electrical load.

The control circuit 150 may also enable the operation of the boost converter 130 in the DC mode when the power $P_{LOAD}$ required by LED light source 102 exceeds a threshold amount $P_{TH}$ (e.g., approximately 80%). In addition, the control circuit 150 may also be configured to control the target bus voltage $V_{BUS-TARGET}$ as a function of the power $P_{LOAD}$ required by LED light source 102, for example, as shown in FIG. 2. The control circuit 150 may be configured to adjust the target bus voltage $V_{BUS-TARGET}$ linearly between the minimum magnitude $V_{BUS-MIN}$ and the maximum magnitude $V_{BUS-MAX}$ when the power $P_{LOAD}$ required by LED light source 102 is above the threshold amount $P_{TH}$. The control circuit 150 may be configured to control the target bus voltage $V_{BUS-TARGET}$ using open loop control, for example, by using a lookup table to determine the target bus voltage $V_{BUS-TARGET}$ in response to the target intensity $L_{TRGT}$ and/or target load current $I_{TRGT}$. The control circuit 150 may also be configured to control the target bus voltage $V_{BUS-TARGET}$ using closed loop control, for example, by using the load voltage feedback signal $V_{V-LOAD}$ and the load current feedback signal $V_{I-LOAD}$ to determine the power $P_{LOAD}$ required by LED light source 102. The control circuit 150 may be configured to learn the target intensity $L_{TRGT}$ and/or the target load current $I_{TRGT}$ at which the power $P_{LOAD}$ required by LED light source 102 exceeds the threshold amount $P_{TH}$ (e.g., during a startup routine).

The control circuit 150 may be configured to temporarily increase the magnitude of the bus voltage $V_{BUS}$ during transient events (e.g., when increasing and/or decreasing the target intensity $L_{TRGT}$ and/or the target load current $I_{TRGT}$).

Rather than disabling the boost converter 130 in the DC mode, the control circuit 150 may also scale back the operation of the boost converter (e.g., reduce the target bus voltage $V_{BUS-TARGET}$) so as to reduce losses in the boost converter.

Figure 3:
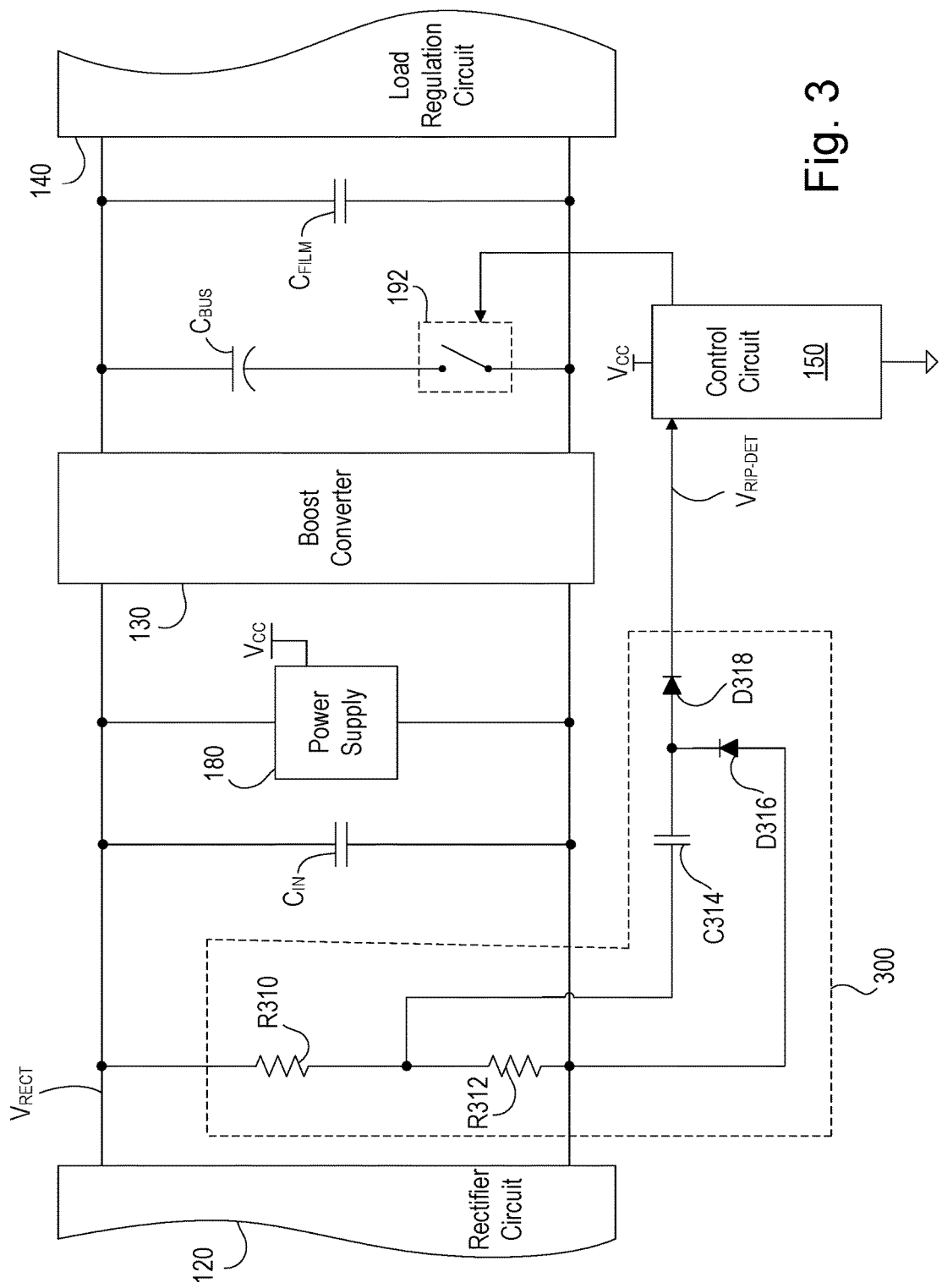
FIG. 3 is an example diagram of an AC ripple detect circuit for an LED driver.

FIG. 3 is an example diagram of an AC ripple detect circuit 300 for an LED driver. The AC ripple detect circuit 300 may be an example of the AC ripple detect circuit 190 of the LED driver 100 shown in FIG. 1. The AC ripple detect circuit 300 may include resistors R310, R312, capacitor C314, and diodes D316, D318. The AC ripple detect circuit 300 may receive the rectified voltage $V_{RECT}$ and may generate the ripple detect signal $V_{RIP-DET}$. The control circuit 150 may receive the ripple detect signal $V_{RIP-DET}$ and may determine whether AC voltage or DC voltage is connected to the input terminals (e.g., the input terminals 104, 106).

For example, the control circuit 150 may receive the ripple detect signal $V_{RIP-DET}$ and determine whether AC ripple is present in the rectified voltage $V_{RECT}$.

If AC voltage is present at the input terminals 104, 106, a full-wave rectified voltage may be present at the resistor R310. The full-wave rectified voltage may be twice the normal line frequency. The full-wave rectified voltage may be divided via the resistors R310, R312, and the divided voltage may charge the capacitor C314 and be fed through the diode D318 to generate the ripple detect signal $V_{RIP-DET}$. If DC voltage is present at the input terminals 104, 106, the voltage present at the resistor R310 will not be characterized by a significant AC frequency component. As such, the capacitor C314 will not charge, resulting in the ripple detect signal $V_{RIP-DET}$ having a lower value (e.g., 0 volts) than instances where AC voltage is present at the input terminals 104, 106. Accordingly, the control circuit 150 may receive the ripple detect signal $V_{RIP-DET}$, and may operate in an AC mode if an AC voltage is coupled to the input terminals 104, 106, or a DC mode if a DC voltage is coupled to the input terminals. The ripple detect circuit 300 may also be coupled to receive the input voltage $V_{IN}$ and/or the bus voltage $V_{BUS}$.

Figure 4:
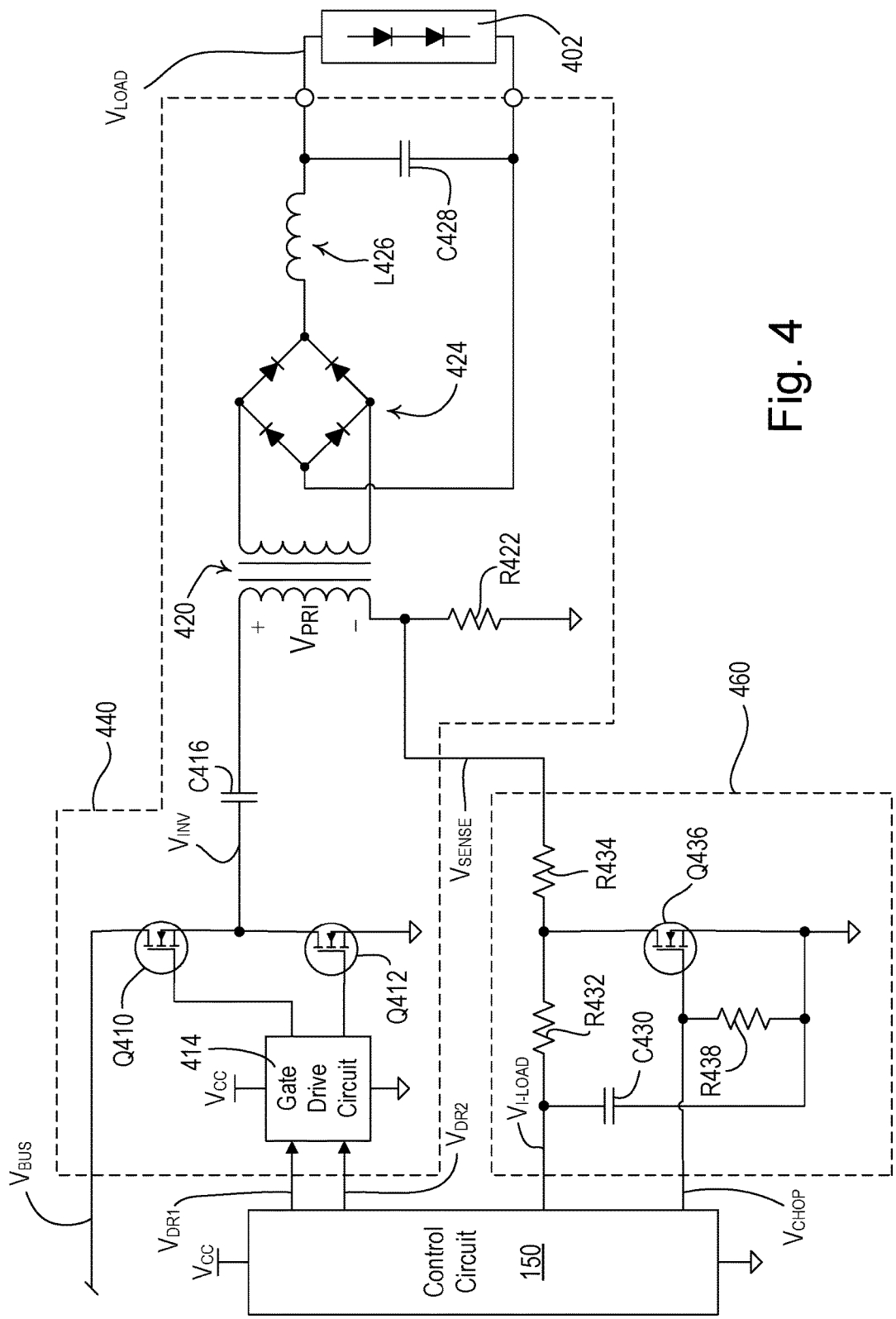
FIG. 4 is a simplified schematic diagram of an example isolated, half-bridge forward converter and a current sense circuit of an LED driver.

FIG. 4 is a simplified schematic diagram of an isolated, half-bridge forward converter 440 and a current sense circuit 460 of an LED driver (e.g., the LED driver 100 shown in FIG. 1). The forward converter 440 may be an example of the load regulation circuit 140 of the LED driver 100 shown in FIG. 1. The current sense circuit 460 may be an example of the current sense circuit 160 of the LED driver 100 shown in FIG. 1.

The forward converter 440 may comprise a half-bridge inverter circuit having two field effect transistors (FETs) Q410, Q412 for generating a high-frequency inverter voltage $V_{INV}$ from the bus voltage $V_{BUS}$. The FETs Q410, Q412 may be rendered conductive and non-conductive in response to the drive control signals $V_{DR1}$, $V_{DR2}$. The drive control signals $V_{DR1}$, $V_{DR2}$ may be received from the control circuit 150. The drive control signals $V_{DR1}$, $V_{DR2}$ may be coupled to the gates of the respective FETs Q410, Q412 via a gate drive circuit 414 (e.g., which may comprise part number L6382DTR, manufactured by ST Microelectronics). The control circuit 150 may generate the inverter voltage $V_{INV}$ at a constant operating frequency fop (e.g., approximately 60-65 kHz) and thus a constant operating period $T_{OP}$. However, the operating frequency fop may be adjusted under certain operating conditions. For example, the operating frequency fop may be decreased near the high-end intensity $L_{HE}$. The control circuit 150 may be configured to adjust a duty cycle $DC_{INV}$ of the inverter voltage $V_{INV}$ to control the intensity of an LED light source 402 towards the target intensity $L_{TRGT}$. The control circuit 150 may adjust the duty cycle $DC_{INV}$ of the inverter voltage $V_{INV}$ to adjust the magnitude (e.g., the average magnitude $I_{AVE}$) of the load current $I_{LOAD}$ towards the target load current $I_{TRGT}$. The magnitude of the load current $I_{LOAD}$ may vary between a maximum rated current $I_{MAX}$ and a minimum rated current $I_{MIN}$.

The inverter voltage $V_{INV}$ may be coupled to the primary winding of a transformer 420 through a DC-blocking capacitor C416 (e.g., which may have a capacitance of approximately 0.047 μg), such that a primary voltage $V_{PRI}$ is generated across the primary winding. The transformer 420 may be characterized by a turns ratio $n_{TURNS}$ (i.e., $N_1/N_2$), which may be approximately 115:29. A sense voltage $V_{SENSE}$ may be generated across a sense resistor R422, which may be coupled in series with the primary winding of the transformer 420. The secondary winding of the transformer 420 may generate a secondary voltage that may be coupled to the input terminals of a full-wave diode rectifier bridge 424 for rectifying the secondary voltage generated across the secondary winding. The positive output terminal of the rectifier bridge 424 may be coupled to the LED light source 402 through an output energy-storage inductor L426 (e.g., which may have an inductance of approximately 10 mH), such that the load voltage $V_{LOAD}$ may be generated across an output capacitor C428 (e.g., which may have a capacitance of approximately 3 μF).

The current sense circuit 460 may comprise an averaging circuit for producing the load current feedback signal $V_{I-LOAD}$. The averaging circuit may comprise a low-pass filter comprising a capacitor C430 (e.g., which may have a capacitance of approximately 0.066 uF) and a resistor R432 (e.g., which may have a resistance of approximately 3.32 kΩ). The low-pass filter may receive the sense voltage $V_{SENSE}$ via a resistor R434 (e.g., which may have a resistance of approximately 1 kΩ). The current sense circuit 460 may comprise a transistor Q436 (e.g., a FET as shown in FIG. 4) coupled between the junction of the resistors R432, R434 and circuit common. The gate of the transistor Q436 may be coupled to circuit common through a resistor R438 (e.g., which may have a resistance of approximately 22 kΩ). The gate of the transistor Q436 may receive the signal-chopper control signal $V_{CHOP}$ from the control circuit 150. An example of the current sense circuit 460 may be described in greater detail in commonly-assigned U.S. Pat. No. 9,232,574, issued Jan. 5, 2016, entitled FORWARD CONVERTER HAVING A PRIMARY-SIDE CURRENT SENSE CIRCUIT, the entire disclosure of which is hereby incorporated by reference.

Figure 5:
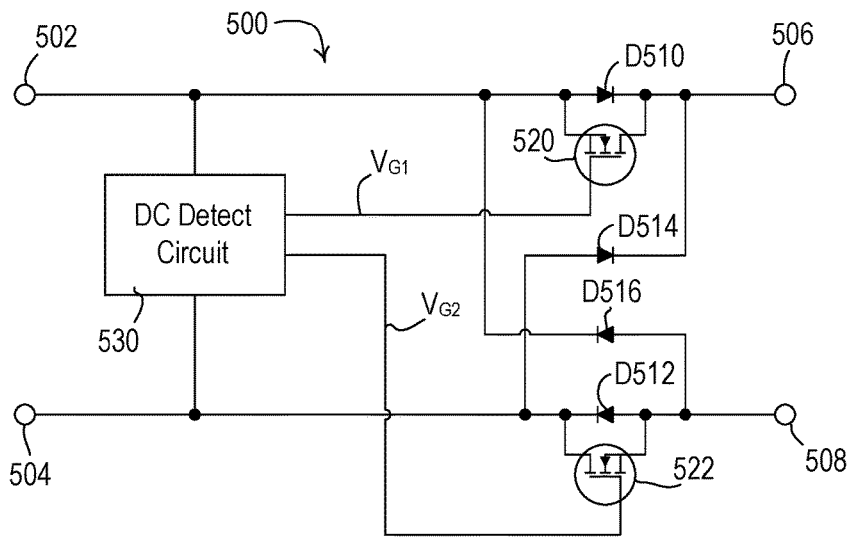
FIG. 5 is a simplified schematic diagram of an example rectifier circuit.

FIG. 5 is a simplified schematic diagram of an example rectifier circuit 500 (e.g., the rectifier circuit 120 of the LED driver 100 shown in FIG. 1). The rectifier circuit 500 may comprise first and second input terminals 502, 504 (e.g., AC input terminals) and first and second output terminals 506, 508 (e.g., DC output terminals). The rectifier circuit 500 may comprise a full-wave rectifier including four diodes 510, 512, 514, 516. The first diode 510 may be electrically coupled between the first input terminal 502 and the first output terminal 506, and may be configured to conduct current from the first input terminal 502 to the first output terminal 506. The second diode 512 may be electrically coupled between the second input terminal 504 and the second output terminal 508, and may be configured to conduct current from the second output terminal 508 to the second input terminal 504. The third diode 514 may be electrically coupled between the second input terminal 504 and the first output terminal 506, and may be configured to conduct current from the second input terminal 504 to the first output terminal 506. The fourth diode 516 may be electrically coupled between the first input terminal 502 and the second output terminal 508, and may be configured to conduct current from the second output terminal 508 to the first input terminal 502.

The rectifier circuit 500 may comprise a first controllable switching circuit 520 (e.g., a MOSFET) having main terminals electrically coupled in parallel with the first diode 510, and a second controllable switching circuit 522 (e.g., a MOSFET) having main terminals electrically coupled in parallel with the second diode 512. The first and second diodes 510, 512 may be body diodes of the first and second controllable switching circuits 520, 522, respectively, or may be implemented as separate parts. The rectifier circuit 500 may be configured to operate in an AC mode when a voltage (e.g., an input voltage) across the input terminals 502, 504 is an AC voltage, and in a DC mode when the voltage across the input terminals is a DC voltage. The first and second switching circuits 520, 522 may be rendered non-conductive in the AC mode (e.g., when the voltage across the input terminals is an AC voltage), and rendered conductive in the DC mode (e.g., when the voltage across the input terminals is a DC voltage).

The rectifier circuit 500 may further comprise a rectifier control circuit, such as a DC detect circuit 530, coupled between the input terminals 502, 504 to receive the voltage across the input terminals. The DC detect circuit 530 may be configured to generate gate drive voltages $V_{G1}$, $V_{G2}$ that may be coupled to gate terminals of the MOSFETs of the first and second controllable switching circuits 520, 522, respectively, for rendering the first and second controllable switching circuits conductive and non-conductive.

Figure 6:
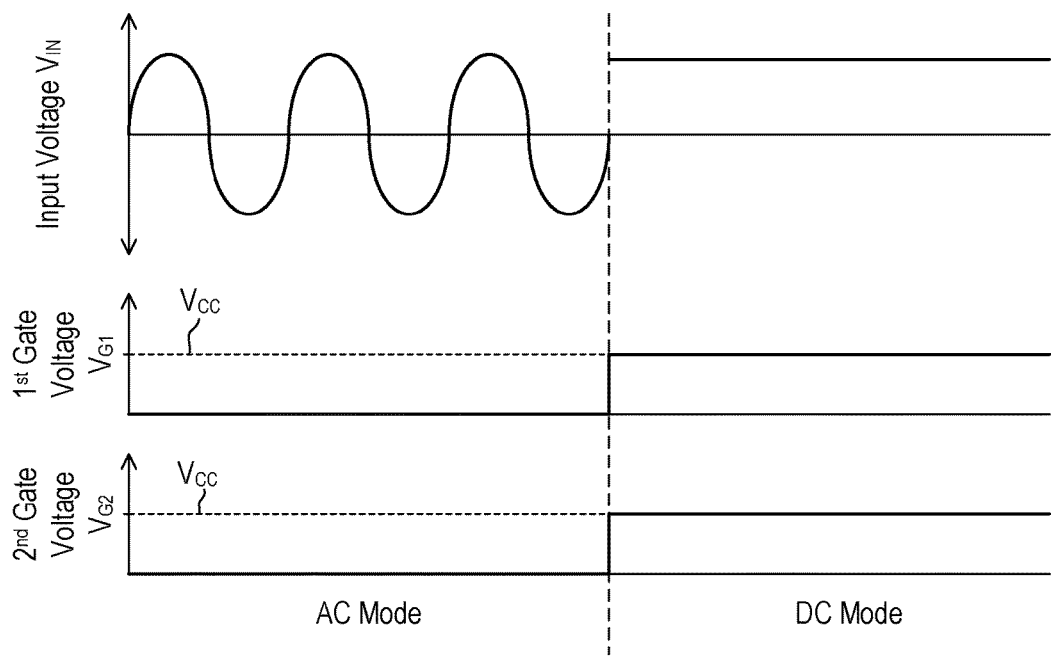
FIG. 6 are example waveforms illustrating the operation of the rectifier circuit of FIG. 5.

FIG. 6 illustrates example waveforms of the rectifier circuit 500 when the rectifier circuit is operating in the AC mode and in the DC mode. The DC detect circuit 530 may be configured to control the magnitudes of the first and second gate drive voltages $V_{G1}$, $V_{G2}$ towards a circuit common (e.g., approximately zero volts) to render the first and second controllable switching circuits 520, 522 non-conductive in the AC mode when the input voltage (e.g., the voltage across the input terminals 502, 504) is an AC voltage. The DC detect circuit 530 may be configured to control the magnitudes of the first and second gate drive voltages $V_{G1}$, $V_{G2}$ towards a supply voltage $V_{CC}$ (e.g., as generated by the power supply 180 of the LED driver 100 in FIG. 1) to render the first and second controllable switching circuits 520, 522 conductive in the DC mode when the input voltage (e.g., the voltage across the terminals 502, 504) is a DC voltage.

Figure 7:
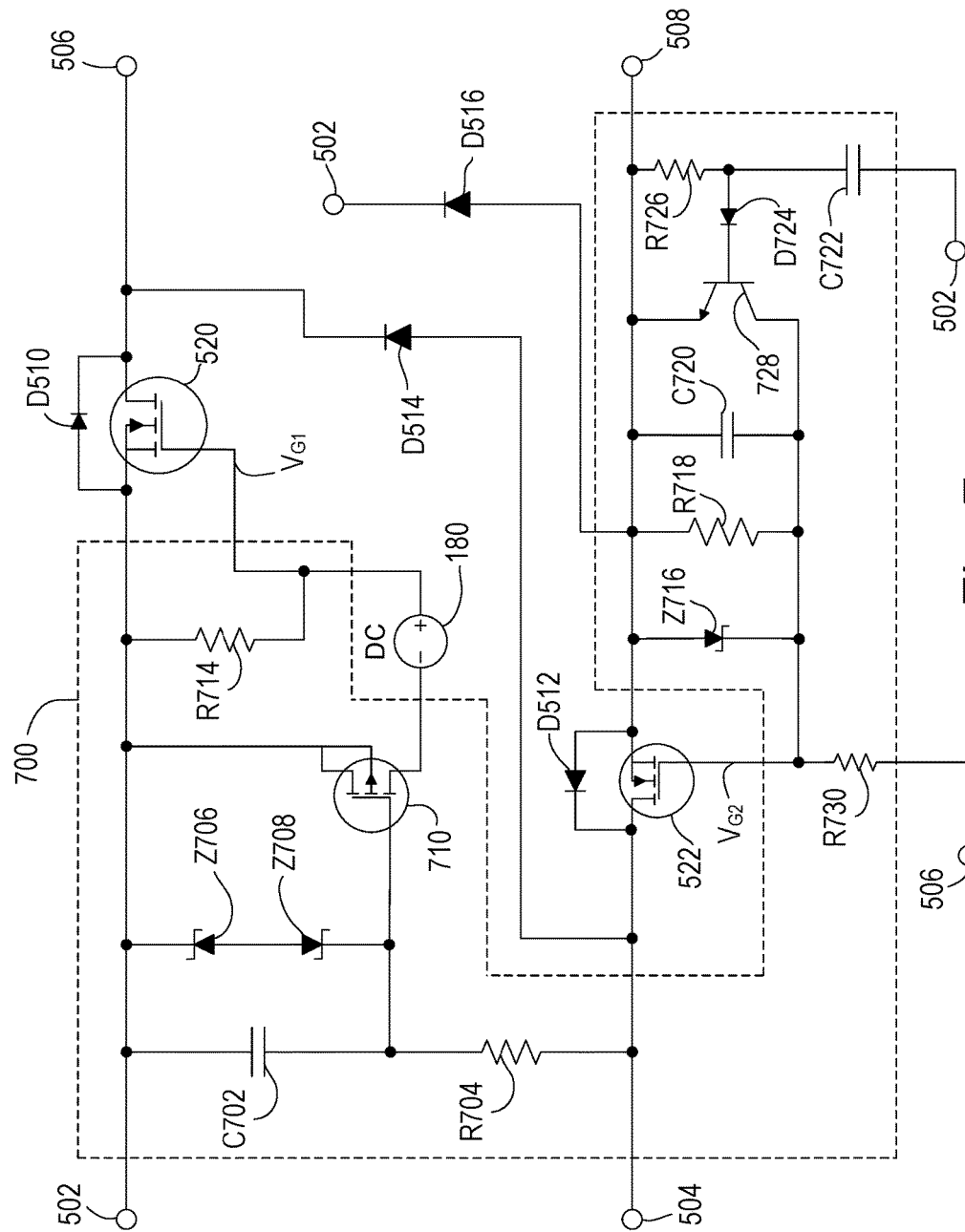
FIG. 7 is an example diagram of a DC detect circuit for an LED driver.

FIG. 7 is an example diagram of a DC detect circuit 700 for an LED driver. The DC detect circuit 700 may be an example of the DC detect circuit 530 of FIG. 5. As such, the DC detect circuit 700 may be part of a rectifier circuit, such as the rectifier circuit 500 shown in FIG. 5. The DC detect circuit 700 may include two input terminals, such as the first and second input terminals 502, 504 (e.g., AC input terminals) of the rectifier circuit 500. Further, the DC detect circuit may be connected to two output terminals through an AC/DC rectifier circuit, such as the first and second output terminals 506, 508 (e.g., DC output terminals) of the rectifier circuit 500. Accordingly, the DC detect circuit 700 may be configured to generate gate drive voltages for controlling controllable switching circuits, such as the gate drive voltages $V_1$, $V_{G2}$ that are coupled to gate terminals of the MOSFETs of the first and second controllable switching circuits 520, 522, respectively, for rendering the first and second controllable switching circuits conductive and non-conductive. In this regard, the DC detect circuit may operate whether it is coupled to an AC voltage or to a DC voltage via the input terminals 502, 504.

The DC detect circuit 700 may include capacitors C702, C720, and C722, resistors R704, R714, R718, R726, and R730, Zener diodes Z706, Z708, and Z716, a diode D724, a MOSFET 710, and an NPN transistor 728. The DC detect circuit 700 may include a power supply, or use a power supply of the LED drive, such as the power supply 180, for example.

When an AC voltage is coupled to the input terminals 502, 504, the combination of the capacitor C702 and resistor R704 will cause there to be a net zero DC voltage across the capacitor C702. As a result, the MOSFET 520 will be non-conductive and in diode mode across diode 510. Further, when an AC voltage is coupled to the input terminals 502, 504, the combination of the capacitor C722 and resistor R726 will cause there to be a net zero DC voltage across the capacitor C722. For example, the NPN transistor 728 may see pulsing currents at its gate, rendering the NPN transistor 728 conductive and causing the capacitor C720 to discharge. The discharge of the capacitor C720 may cause the MOSFET 522 to be rendered non-conductive and in diode mode across the diode 512. Accordingly, when an AC voltage is coupled to the input terminals 502, 504, the DC detect circuit will not drive either of the MOSFETs 520, 522 to be conductive such that the diodes 510, 512, 514, 516 act as a full-wave rectifier.

When a DC voltage is coupled to the input terminals 502, 504, the Zener diodes Z706, Z708 will clamp the input DC voltage and cause the capacitor C702 to charge. When the capacitor C702 is charged, the MOSFET 710 will turn on, which will drive the first gate drive voltage $V_{G1}$ towards a supply voltage $V_{CC}$ (e.g., as generated by the power supply 180 of the LED driver 100 in FIG. 1) and render the MOSFET 520 conductive. Further, when a DC voltage is coupled to the input terminals 502, 504, the capacitor C722 will charge and there will not be pulsing currents flowing through R726 (e.g., as is seen when AC voltage is coupled to the input terminals). As a result, the NPN transistor 728 will be rendered non-conductive, which will drive the second gate drive voltage $V_{G2}$ towards the supply voltage $V_{CC}$ and render the MOSFET 522 conductive. When the MOSFETs 520, 522 are conductive, the voltage losses across the diodes 510, 512 are eliminated.

Figure 8:
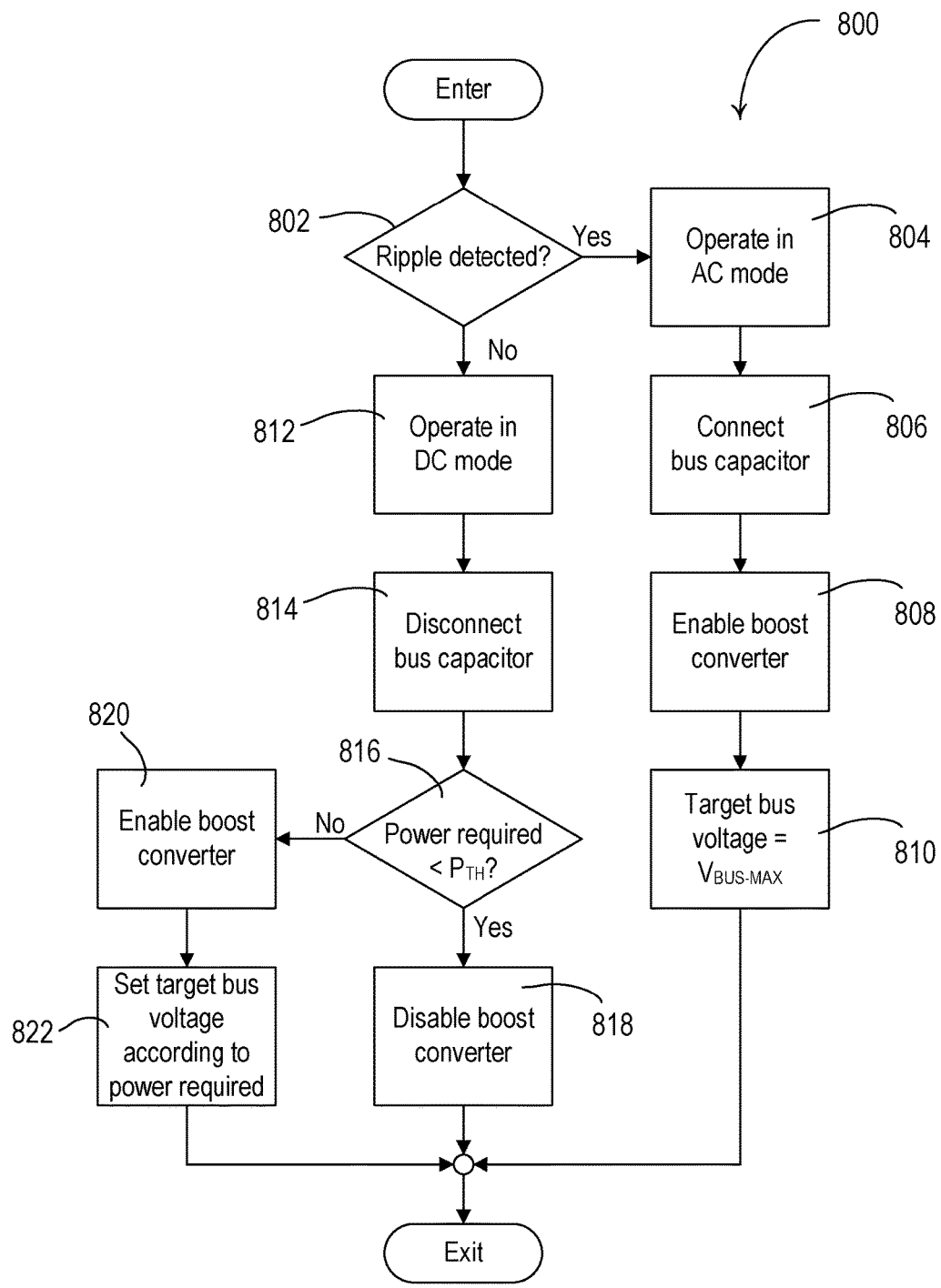
FIG. 8 is a simplified flowchart of an example control procedure executed by a control circuit of a load control device (e.g., an LED driver).

FIG. 8 is a simplified flowchart of an example control procedure 800 that may be executed by a control circuit of a load control device (e.g., the control circuit 150 of the LED driver 100). For example, the control procedure 800 may be executed periodically to control the LED driver to operate in an AC mode or a DC mode in response to ripple detected on an input voltage of the LED driver. At 802, the control circuit may determine whether the ripple detect signal $V_{RIP-DET}$ indicates that AC voltage or DC voltage is coupled to the input terminals (e.g., the input terminals 104, 106). If the control circuit determines that AC voltage is coupled to the input terminals at 802, then the control circuit may operate in AC mode at 804. For example, the control circuit may ensure that the bus capacitor is connected at 806. For instance, the control circuit may connect the bus capacitor by closing a switch (e.g., the controllable switching circuit 192) at 806. The control circuit may also enable the boost converter at 808, and set the target bus voltage to $V_{BUS-MAX}$ at 810.

If the control circuit determines that DC voltage is coupled to the input terminals at 802, then the control circuit may operate in DC mode at 812. For example, the control circuit may ensure that the bus capacitor is disconnected at 814. For instance, the control circuit may disconnect the bus capacitor by opening the switch (e.g., the controllable switching circuit 192) at 814. At 816, the control circuit may determine whether the power $P_{LOAD}$ required by the electrical load exceeds a threshold amount $P_{TH}$ (e.g., approximately 80%). If the control circuit determines that the power $P_{LOAD}$ required by the electrical load does not exceed the threshold amount $P_{TH}$ at 816, then the control circuit may disable the boost converter at 818. For example, the control circuit may disable the boost converter to reduce power loss in the LED driver, for example, due to the power loss in the boost converter when enabled. When disabled, the boost converter may pass through the DC voltage from the input terminals, and the bus voltage $V_{BUS}$ may have a minimum magnitude $V_{BUS-MIN}$ (e.g., approximately 380 volts). In some instances, when operating in the DC mode, the control circuit may be configured to enable the boost converter during a startup routine (not shown) of the LED driver, and disable the boost converter during normal operation.

If the control circuit determines that the power $P_{LOAD}$ required by the electrical load does exceed the threshold amount $P_{TH}$ at 816, then the control circuit may enable the boost converter at 820. At 822, the control circuit may set the target bus voltage according to the power required. For example, the control circuit may be configured to control the target bus voltage $V_{BUS\text{-}TARGET}$ as a function of the power $P_{LOAD}$ required by LED light source 102. The control circuit may be configured to adjust the target bus voltage $V_{BUS\text{-}TARGET}$ linearly between the minimum magnitude $V_{BUS\text{-}MIN}$ and the maximum magnitude $V_{BUS\text{-}MAX}$ when the power $P_{LOAD}$ required by LED light source is above the threshold amount $P_{TH}$. The control circuit may be configured to control the target bus voltage $V_{BUS\text{-}TARGET}$ using open loop control, for example, by using a lookup table to determine the target bus voltage $V_{BUS\text{-}TARGET}$ in response to the target intensity $L_{TRGT}$ and/or target load current $I_{TRGT}$. The control circuit may be configured to control the target bus voltage $V_{BUS\text{-}TARGET}$ using closed loop control, for example, by using the load voltage feedback signal $V_{V\text{-}LOAD}$ and the load current feedback signal $V_{I\text{-}LOAD}$ to determine the power $P_{LOAD}$ required by LED light source. The control circuit may be configured to learn the target intensity $L_{TRGT}$ and/or the target load current $I_{TRGT}$ at which the power $P_{LOAD}$ required by LED light source exceeds the threshold amount $P_{TH}$ (e.g., during a startup routine).

Although described with reference to an LED driver, one or more embodiments described herein may be used with other load control devices. Also, a single control circuit may be coupled to, and/or adapted to, control multiple types of electrical loads in a load control system.

What is claimed is:

1. A load control device for controlling power delivered from a power source to an electrical load, the load control device configured to receive an input voltage from the power source, the load control device comprising:
   a power converter configured to generate a bus voltage;
   a load regulation circuit configured to receive the bus voltage and to control the power delivered to the electrical load;
   a rectifier circuit configured to receive the input voltage from the power source, the rectifier circuit configured to rectify the input voltage to generate a rectified voltage and provide the rectified voltage to the power converter when the input voltage is an AC voltage, the rectifier circuit further configured to pass through the input voltage to the power converter when the input voltage is a DC voltage, the rectifier comprising first and second input terminals, first and second output terminals, a first controllable switching circuit, and a second controllable switching circuit, the first and second switching circuits rendered non-conductive when the input voltage is an AC voltage and rendered conductive when the input voltage is a DC voltage; and
   a control circuit configured to control the load regulation circuit to control the power delivered to the electrical load, the control circuit configured to operate in an AC mode when the input voltage is an AC voltage and in a DC mode when the input voltage is a DC voltage; wherein the control circuit is configured to disable the power converter when operating in the DC mode.

2. The load control device of claim 1, wherein the rectifier circuit comprises:
   a first diode configured to conduct current from the first input terminal to the first output terminal;
   a second diode configured to conduct current from the second output terminal to the second input terminal;
   a third diode configured to conduct current from the second input terminal to the first output terminal; and
   a fourth diode configured to conduct current from the second output terminal to the first input terminal;
   wherein the first controllable switching circuit is coupled in parallel with the first diode and the second controllable switching circuit is coupled in parallel with the second diode.

3. The load control device of claim 2, wherein the first and second controllable switching circuits each comprise a MOSFET.

4. The load control device of claim 3, wherein the first and second diodes are body diodes of the MOSFETs of the first and second controllable switching circuits.

5. The load control device of claim 1, wherein the rectifier circuit comprises a DC detect circuit electrically coupled between input terminals of the rectifier circuit, the DC detect circuit configured to render first and second controllable switching circuits of the rectifier circuit conductive when the voltage across the DC detect circuit is a DC voltage.

6. The load control device of claim 1, wherein the control circuit is configured to disable the power converter when the power required by the load is less than a threshold amount in the DC mode.

7. The load control device of claim 6, wherein the control circuit is configured to control the power converter to adjust the magnitude of the bus voltage towards a target bus voltage, the control circuit configured to adjust the target bus voltage as a function of the power required by the electrical load when the power required by the electrical load is greater than the threshold amount in the DC mode.

8. The load control device of claim 1, further comprising:
   a ripple detect circuit configured to receive a rectified voltage and generate a ripple detect signal that indicates whether AC ripple is present in the rectified voltage;
   wherein the control circuit is configured to receive the ripple detect signal, and determine whether the input voltage is AC voltage or DC voltage based on the ripple detect signal.

9. The load control device of claim 1, wherein the control circuit is configured to enable the power converter during a startup routine of the load control device when operating in the DC mode, and configured to disable the power converter during normal operation when operating in the DC mode.

10. The load control device of claim 1, further comprising:
    a bus capacitor; and
    a controllable switching circuit electrically coupled in series with the bus capacitor, the control circuit configured to render the controllable switching circuit non-conductive when operating in the DC mode to disconnect the bus capacitor.

11. The load control device of claim 1, wherein the control circuit is configured to generate a bus voltage control signal and provide the bus voltage control signal to the power converter; and
    wherein the power converter is configured to adjust a magnitude of the bus voltage towards a target bus voltage based on the bus voltage control signal.

12. The load control device of claim 1, wherein the power converter is configured to generate a bus voltage feedback control signal that indicates a magnitude of the bus voltage, and provide the bus voltage feedback control signal to the control circuit.

13. The load control device of claim 1, wherein the control circuit is configured to disable the power converter by allowing the DC voltage to pass through the power converter so that the bus voltage has a minimum bus voltage magnitude.

14. A load control device for controlling power delivered from a power source to an electrical load, the load control device configured to receive an input voltage from the power source, the load control device comprising:
   a power converter configured to receive the input voltage or a rectified version of the input voltage and generate a bus voltage;
   a load regulation circuit configured to receive the bus voltage and to control the power delivered to the electrical load; and
   a control circuit configured to control the load regulation circuit to control the power delivered to the electrical load, the control circuit is configured to control the power converter to adjust the magnitude of the bus voltage towards a target bus voltage, the control circuit configured to operate in an AC mode when the input voltage is an AC voltage and in a DC mode when the input voltage is a DC voltage;
   wherein the control circuit is configured to decrease the target bus voltage when operating in the DC mode.

15. The load control device of claim 14, wherein the control circuit is configured to control the power converter to adjust a magnitude of the bus voltage towards a target bus voltage, the control circuit configured to adjust the target bus voltage as a function of the power required by the electrical load when the power required by the electrical load is greater than a threshold amount in the DC mode.

16. The load control device of claim 14, further comprising:
   a rectifier circuit configured to receive the input voltage from the power source, the rectifier circuit configured to rectify the input voltage to generate the rectified version of the input voltage when the input voltage is the AC voltage, and the rectifier circuit configured to pass through the input voltage when the input voltage is the DC voltage.

17. The load control device of claim 16, wherein the rectifier circuit comprises a DC detect circuit electrically coupled between input terminals of the rectifier circuit, the DC detect circuit configured to render first and second controllable switching circuits of the rectifier circuit conductive when the voltage across the DC detect circuit is a DC voltage.

18. The load control device of claim 14, further comprising:
   a ripple detect circuit configured to receive a rectified voltage and generate a ripple detect signal that indicates whether AC ripple is present in the rectified voltage;
   wherein the control circuit is configured to receive the ripple detect signal, and determine whether the input voltage is AC voltage or DC voltage based on the ripple detect signal.

19. A load control device for controlling power delivered from a power source to an electrical load, the load control device configured to receive an input voltage from the power source, the load control device comprising:
   a power converter configured to receive the input voltage or a rectified version of the input voltage and generate a bus voltage across a bus capacitor;
   a load regulation circuit configured to receive the bus voltage and to control the power delivered to the electrical load;
   a controllable switching circuit electrically coupled in series with the bus capacitor; and
   a control circuit configured to control the load regulation circuit to control the power delivered to the electrical load, the control circuit configured to operate in an AC mode when the input voltage is an AC voltage and in a DC mode when the input voltage is a DC voltage;
   wherein the control circuit is configured to render the controllable switching circuit conductive in the AC mode and non-conductive in the DC mode.

* * * * *